United States Patent [19]
Yoshimura et al.

[11] Patent Number: 5,371,343
[45] Date of Patent: Dec. 6, 1994

[54] HEATING COOKING DEVICE HAVING A WAVE GUIDE AND FEEDER PORT DISPOSED PERPENDICULAR TO A ROTARY TABLE

[75] Inventors: Hirofumi Yoshimura, Nara; Toyotsugu Hatagawa, Yamatokoriyama; Yuji Hayakawa; Mitsuo Akiyoshi, both of Nara, all of Japan

[73] Assignee: Matsushita Electric Industrial Co., Ltd., Osaka, Japan

[21] Appl. No.: 64,425

[22] Filed: May 21, 1993

[30] Foreign Application Priority Data

Jun. 1, 1992 [JP] Japan .................... 4-139562
Jun. 1, 1992 [JP] Japan .................... 4-140237

[51] Int. Cl.⁵ .................................. H05B 6/74
[52] U.S. Cl. .................. 219/746; 219/751; 219/764
[58] Field of Search ............ 219/10.55 F, 10.55 A, 219/10.55 R, 10.55 E, 746, 748, 749, 751, 754

[56] References Cited

U.S. PATENT DOCUMENTS

| 2,920,174 | 1/1960 | Haagensen | 219/10.55 F |
| 3,789,179 | 1/1974 | Haagensen . | |
| 3,884,213 | 5/1975 | Smith | 219/10.55 F |
| 4,133,997 | 1/1979 | Thuleen | 219/10.55 F |
| 4,363,957 | 12/1982 | Tachikawa et al. | 219/10.55 F |
| 4,765,066 | 8/1988 | Yoon . | |
| 5,177,333 | 1/1993 | Ogasawara | 219/10.55 F |
| 5,237,139 | 8/1993 | Berg et al. | 219/10.55 A |

FOREIGN PATENT DOCUMENTS

| 3216544 | 11/1982 | Germany . |
| 3142633 | 5/1983 | Germany . |
| 3642235 | 8/1987 | Germany . |
| 4115828 | 11/1991 | Germany . |
| 2160395 | 6/1990 | Japan . |
| 984424 | 2/1965 | United Kingdom . |
| 2083730 | 3/1982 | United Kingdom . |

*Primary Examiner*—Philip H. Leung
*Attorney, Agent, or Firm*—Spencer, Frank & Schneider

[57] ABSTRACT

There is disclosed a heating cooking device including a heating chamber for heating an object to be heated, a high-frequency oscillator for generating high-frequency electromagnetic waves, a wave guide for guiding the high-frequency electromagnetic waves from the high-frequency oscillator to the heating chamber, a rotary table for supporting thereon the object to be heated for rotation therewith, and a wave stirrer fan for stirring the electromagnetic waves in the heating chamber. A feeder port of the wave guide is disposed at a side of the heating chamber, and the wave stirrer fan is disposed within the wave guide in opposed relation to the feeder port. The high-frequency oscillator is disposed on the side of the feeder port. The feeder port is larger in size than the wave stirrer fan.

18 Claims, 8 Drawing Sheets

HEATING COOKING DEVICE HAVING A WAVE GUIDE AND FEEDER PORT DISPOSED PERPENDICULAR TO A ROTARY TABLE

BACKGROUND OF THE INVENTION

This invention relates generally to a high-frequency heating device commonly called "microwave oven or electronic oven" in which high-frequency induction heating is used for uniformly heating an object to be heated, such as food, and more particularly to such a heating device of the type in which the degree of uniform heating, for example, of a piece of frozen sea food or frozen meat (which most particularly need to be uniformly heated) by high-frequency electromagnetic waves within a heating chamber can be increased.

High-frequency heating used for thawing frozen food is characterized in that the time required for thawing is short; however, in the high-frequency heating, the degree of heating is about 1,000 times higher in a thawed condition than in a frozen condition, and therefore if a certain portion of the frozen food is thawed, this portion is excessively heated to be boiled whereas the other portions still remain frozen. This is a disadvantage of the high-frequency heating. Therefore, unless the degree of the high-frequency heating is kept uniform, a satisfactory thawing performance can not be obtained.

Many methods of uniformly heating an object to be heated within a heating chamber have heretofore been proposed. These includes a stirrer fan-type in which high-frequency electromagnetic waves are stirred by a stirrer fan, a rotary table-type in which the object to be heated is rotated by a rotary table, and a type in which an antenna for radiating electromagnetic waves is rotated. There is also a type having the features of the stirrer fan-type and the rotary table-type.

A typical example of such arrangement is disclosed in Japanese Patent Examined Publication No. 60-25875, in which a rotary table is mounted on a bottom of a heating chamber or oven compartment, and a stirrer fan is provided at the rear of the heating chamber so as to uniformly heat an object to be heated.

More specifically, as shown in FIG. 9, the rotary table 34 is mounted on the bottom of the heating chamber 33. A wave stirrer fan 37 of metal is mounted on a convexly-drawn portion 36 of a rear wall 35 of the heating chamber 33, and electric waves, radiated or applied into the heating chamber 33 through a wave guide 39 mounted on a top wall 38 of the heating chamber 33, are stirred by the wave stirrer fan 37, and in this condition the rotary table 34 is rotated to rotate the object 40 to be heated so as to uniformly heat the same.

In this arrangement, however, all of the high-frequency electromagnetic waves radiated into the heating chamber 33 are not stirred by the wave stirrer fan 37, and therefore the stirring effect is not adequate. And besides, since the wave guide 39 is provided on the top wall 38 of the heating chamber 33, an upper portion of the load tends to be heated more strongly than the other portions. Moreover, in the type of heating cooking device which has electric heaters provided respectively at the upper and lower sides of the heating chamber, it is difficult to provide the upper heater of a satisfactory construction because of the provision of the wave guide 39, which results in a problem that a sufficient distribution of heat by the heaters could hardly be obtained.

In another conventional heating device as disclosed in U.S. Pat. No. 2,748,239, an opening for admitting high-frequency electromagnetic waves is provided in a rear wall of an oven compartment, and wave stirrer blades are mounted within a wave guide connected to the opening, and the wave stirrer blades are rotated so as to make uniform the electric field of the high-frequency electromagnetic waves within the oven compartment; however, since the opening is provided at the rear side of the oven compartment, a rear portion of an object to be heated, such as food, tends to be inevitably heated strongly. This tendency is not eliminated even if the high-frequency electromagnetic waves are stirred by the wave stirrer blades. Therefore, in the thawing which requires a high degree of uniformity of the high-frequency electromagnetic waves, part of the food is boiled whereas the other parts remain frozen.

U.S. Pat. No. 4,136,271 discloses a method in which an antenna for radiating high-frequency electromagnetic waves, as well as a wave stirrer fan for stirring the high-frequency electromagnetic waves, is provided at an upper side, and a rotary table is provided at a bottom side. In this method, since the antenna and the wave stirrer fan are disposed close to each other, a sufficient stirring effect is achieved by the wave stirrer fan; however, because the electromagnetic wave supply portion is disposed at the upper side, it is difficult for the wave energy to reach the central portion of the rotary table, and it is difficult to obtain a balance of heating between the central portion and outer peripheral portion of the rotary table, and the outer peripheral portion tends to be heated more strongly than the central portion. As a result, a uniform heating has not been achieved. Where the electromagnetic wave supply portion is provided at the upper side, the electromagnetic waves supplied from the upper side are once reflected by the side or peripheral wall of the oven compartment, and then reach the surface of the rotary table. Therefore, when the size of the oven compartment or the position of the wave supply portion is changed slightly, the degree of heating in the vicinity of the surface of the rotary table is greatly changed. Furthermore, there has been encountered another disadvantage that when milk or the like held in a cup is warmed, an upper portion thereof is inevitably heated strongly.

In any of the above-mentioned methods, the distribution of the electromagnetic waves has not been uniform enough to enable a uniform thawing of the frozen food. In the general heating other than the thawing, unevenness in heating has also been encountered.

SUMMARY OF THE INVENTION

With the above problems of the prior art in view, it is an object of this invention to provide a high-frequency heating device which can thaw frozen fish or meat in such a manner that any portion of the food to be thawed is not boiled and does not remain frozen.

Another object of the invention is to provide such a heating device which overcomes a drawback that when warming milk or the like, an upper portion is heated strongly, and a drawback that when heating an object having corners, such corner portions are heated strongly.

A further object of the invention is to provide a heating device which can be easily equipped with heater means, and an uneven heating by the heater means is not encountered.

A still further object of the invention is to provide a heating device which is simple in construction, can be easily assembled, is excellent in durability and reliability, and is safe and durable even if the user uses the heating device in an abnormal way.

According to the present invention, there is provided a heating cooking device comprising:
- a body having a heating chamber for heating an object to be heated;
- a high-frequency oscillator for generating high-frequency electromagnetic waves;
- a wave guide for guiding the high-frequency electromagnetic waves from the high-frequency oscillator to the heating chamber;
- a rotary table for supporting thereon the object to be heated for rotation therewith; and
- a wave stirrer fan for stirring the electromagnetic waves in the heating chamber;
- wherein a feeder port of the wave guide is disposed at a side of the heating chamber, the wave stirrer fan is disposed within the wave guide in opposed relation to the feeder port, the high-frequency oscillator is disposed on the side of the feeder port, and a peripheral edge of the feeder port is different in length from an outer periphery of the wave stirrer fan.

DESCRIPTION OF THE PREFERRED EMBODIMENT OF THE INVENTION

Figure 1:
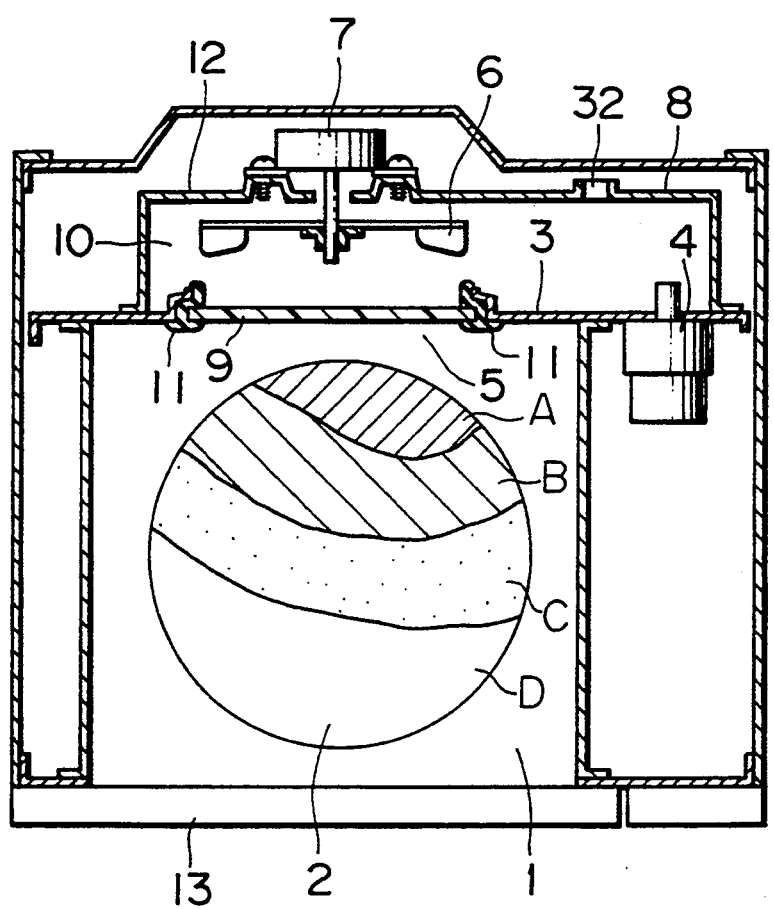
FIG. 1 is a horizontal cross-sectional view of a preferred embodiment of a heating device of the present invention.

FIG. 1 is a horizontal cross-sectional view of a heating cooking device provided in accordance with the present invention. A rotary table 2 for rotation with food or the like placed thereon is provided at a bottom of a heating chamber or oven compartment 1. A high-frequency generator or oscillator 4 is mounted on a portion extending generally horizontally from a rear wall 3 of the heating chamber 1. An opening of a generally square shape serving as a feeder port 5 is formed through the rear wall 3 of the heating chamber 1. A wave stirrer fan 6 of metal is provided in the vicinity of the feeder port 5, and is adapted to be rotated by a drive motor 7. High-frequency electromagnetic waves emitted from the high-frequency generator 4 are guided toward the wave stirrer fan 6 by a wave guide 8, and are stirred by this fan 6, and then are radiated or applied into the heating chamber 1 through the feeder port 5. A feeder port cover 9 is provided in the feeder port 5 to prevent draff of the food from dissipating into a wave stirrer fan chamber 10, the cover 9 being made of a material (e.g. borosilicate glass) which causes a less wave loss and is excellent in heat resistance. A frame 11 made, for example, of silicone rubber, is fitted on the perimeter of the feeder port cover 9, and is fitted in and fixed to the feeder port 5 in the heating chamber rear wall 3 to serve as a seal. The feeder port cover 9 also serves as a thermally-insulating means for preventing the heat within the heating chamber 1 from escaping into the wave stirrer fan chamber 10 when heaters are operated. The wave guide 8 and a partition wall 12 of the wave stirrer fan chamber 10 are formed integrally with each other by drawing. An openable door 13 is provided at the front side of the heating chamber 1 to close an opening provided in the front side of the heating chamber 1.

When food is to be heated within the heating chamber 1, it is naturally necessary that the food should be heated uniformly in all directions, that is, in the directions of the length, width and height of the food material. Within the heating chamber 1, the food placed on the rotary table 2 is rotated in the high-frequency electromagnetic waves which are different in intensity from one place to another within the heating chamber 1, and therefore although the food can be heated uniformly in the circumferential direction, irregularities in the heating are liable to develop in the radial direction. The high-frequency electromagnetic waves, supplied from the high-frequency generator 4 provided laterally adjacent to the rear portion of the heating chamber 1, pass through the wave guide 8, and are horizontally fed into the heating chamber 1 through the feeder port 5 provided at the rear of the heating chamber 1. With respect to a pattern of heating of the rotary table 2 at this time, the area or the food therein near the feeder port 5 is naturally heated strongly, and therefore the heating is effected in a manner shown by hatching in FIG. 1, that is, the intensity of the heating is decreasing progressively away from the feeder port 5. More specifically, the area of the table 2 shown by A designates the area of strong heating intensity. Similarly, the heating intensity in the areas of the table 2 shown by B, C and D are ordinary, weak and very weak, respectively. With this heating pattern, when the rotary table 2 is rotated, heating irregularities are eliminated in the radial direction of the food, but such heating irregularities in the radial direction will not be completely eliminated. The distribution of the instesity of radiation of the high-frequency electromagnetic waves from the feeder port 5 into the heating chamber 1 is varied with the rotation of the wave stirrer fan 6, so that the heating intensity pattern indicated by the hatching also varies or moves three-dimensionally with the rotation of the fan 6. Therefore, the heating irregularities in the radial direction are almost eliminated to provide a generally uniform heating condition.

Figure 2:
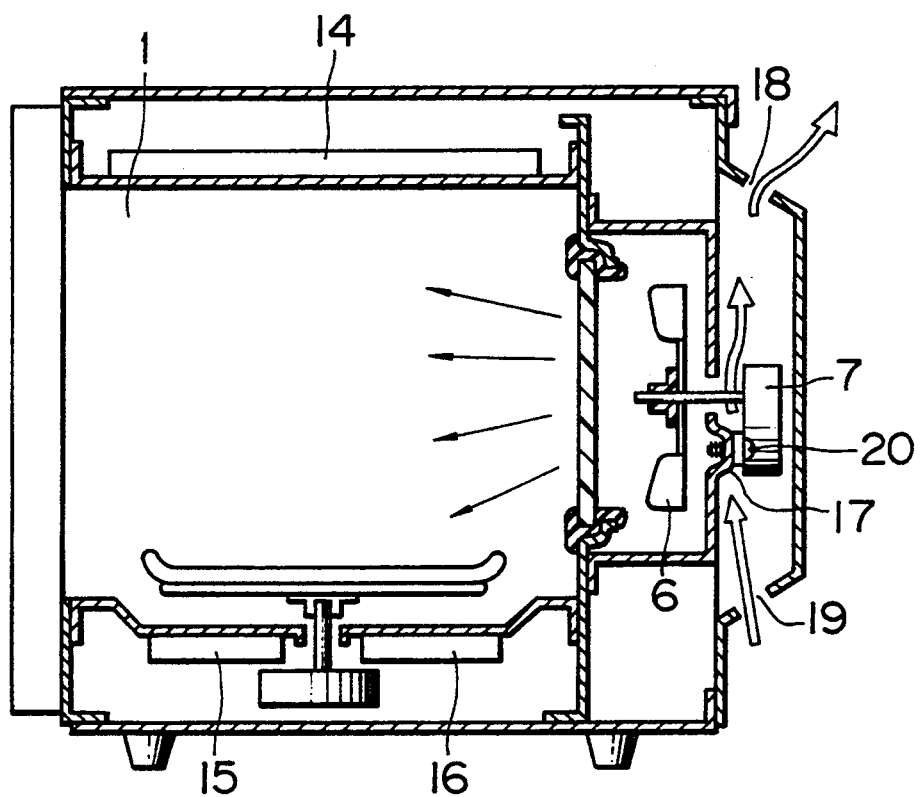
FIG. 2 is a cross-sectional, side view of the heating device.

FIG. 2 is a vertical cross-sectional view of the heating cooking device of FIG. 1. An upper heater 14 and lower heaters 15 and 16 are provided so that the heating by an oven can also be carried out within the heating chamber 1. According to one feature of the illustrated embodiment of the invention, there is provided a mounting portion 17 for the drive motor 7, and this mounting portion 17 is formed by drawing part of the wall 12 of the wave stirrer fan chamber 10 into a convex configuration, so that the drive motor 7 is prevented from being disposed in contiguous relation to the wave stirrer fan chamber 10. If the drive motor 7 is disposed in contiguous relation to the wave stirrer fan chamber 10, the temperature of the drive motor 7 is raised by the radiation heat from the heating chamber 1 and the transfer heat through the wall 12 of the wave stirrer fan chamber 10 when the heaters 14, 15 and 16 are operated, in which case internal gears and grease for these gears need to be of heat-resistant properties, which increases the cost. Cooling openings 18 and 19 are formed in an outer casing, and are disposed on upper and lower sides of the drive motor 7, respectively, and with this arrangement the air flows as indicated by thick arrows because of a natural convection, so that the drive motor 7 is cooled. By providing the drawn portion 17, distal ends of screws 20 fixing the drive motor 7 are not disposed too close to the wave stirrer fan 6, which eliminates the possibility of a spark by the high-frequency electromagnetic waves supplied into the wave guide 8.

The high-frequency electromagnetic waves fed in the horizontal direction in the heating chamber 1 are distributed by the rotating stirrer fan 6 in a well-balanced manner in the upward-downward direction as indicated by thin arrows. Therefore, when a load having a considerable height, such as milk held in a cup, is to be warmed, an upper portion thereof will not be heated strongly, but the whole of the load will be heated quite uniformly.

Figure 3:
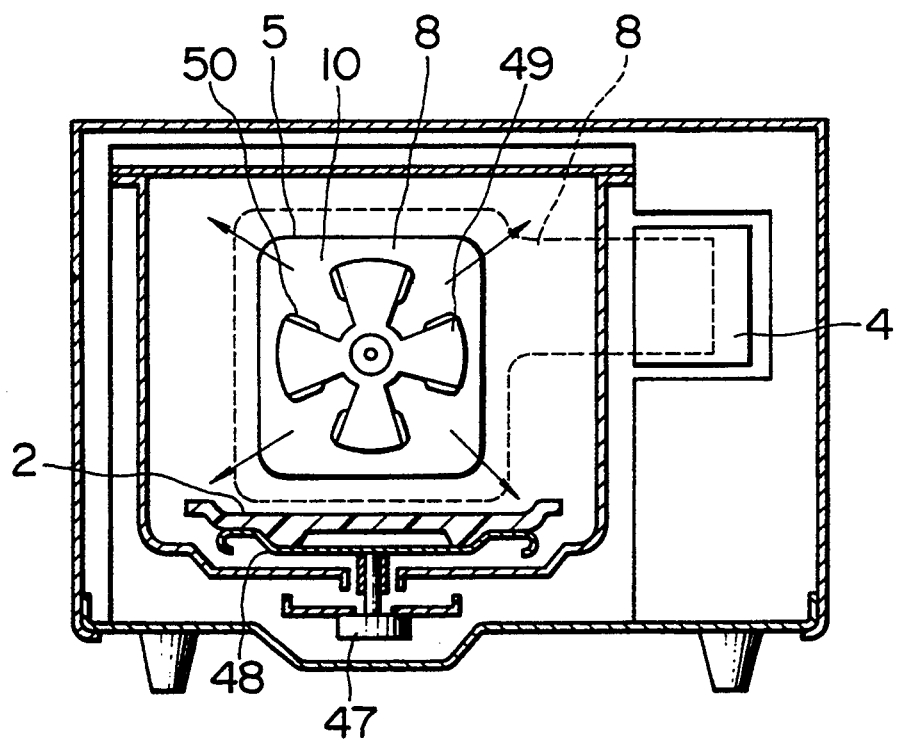
FIG. 3 is a vertical cross-sectional view of the heating device, as viewed from a front side thereof.

FIG. 3 is a vertical cross-sectional view of the heating device of FIG. 1, as viewed from a front side thereof. The rotary table 2 is made of a low-loss dielectric material such as pottery, and is adapted to support thereon an object (not shown) to be heated. A turntable motor 47 for rotating the rotary table 2 is provided beneath the rotary table 2, and a rotation shaft of the turntable motor 47 is connected to a table base 48 rotatable with the rotary table 2.

The wave guide 8 is enlarged or expanded at one end portion thereof to form the wave stirrer fan chamber 10 within which the wave stirrer fan 6 is housed. Although the feeder port cover 9 is provided at the feeder port 5, this cover 9 is omitted in FIG. 3 for illustration purposes.

The feeder port 5 is slightly larger in size than the wave stirrer fan 6, and allows the wave stirrer fan 6 to be easily attached from the front side of the heating chamber 1. In order to efficiently supply the high-frequency electromagnetic waves to the heating chamber 1, the feeder port 5 has a size larger than the wavelength of the high-frequency electromagnetic waves.

Since the outer periphery of the wave stirrer fan 6 is smaller than the feeder port 5, a gap for allowing the high-frequency electromagnetic waves to pass therethrough is formed between the feeder port 5 and the wave stirrer fan 6.

The wave stirrer fan 6 includes four stirrer blades 49 of a generally sector-shape, and the space between any two adjacent ones of the stirrer blades 49 is also generally sector-shaped.

The feeder port 5 has a generally square shape, and each of the corners of this square feeder port 5 is slightly arcuate.

The high-frequency electromagnetic waves from the high-frequency generator 4 are propagated to the wave stirrer fan chamber 10 through the wave guide 8.

The high-frequency electromagnetic waves are radiated into the heating chamber 1 through the generally sector-shaped spaces in the wave stirrer fan 6 as indicated by arrows. Of course, although the high-frequency electromagnetic waves are also radiated into the heating chamber 1 through the gap between the outer peripheral portion of each blade 49 and the feeder port 5, this gap is narrow, and therefore the amount of supply of the high-frequency electromagnetic waves through the generally sector-shaped spaces is much larger than the amount of supply of the waves through the gaps.

The high-frequency electromagnetic waves are radiated from the generally sector-shaped spaces in the stirrer fan 6 as indicated by arrows in FIG. 3. Here, since the wave stirrer fan 6 is rotating, the high-frequency electromagnetic waves are dispersed to all the corners of the heating chamber 1.

If the feeder port 5 has a circular shape, it is difficult for the high-frequency electromagnetic waves to reach the corners of the heating chamber 1 since the heating chamber 1 is of a rectangular parallelepipedic shape. For this reason, the feeder port 5 is formed into a generally-square shape, so that the amount of radiation of the high-frequency electromagnetic waves from the corner portions of the feeder port 5 is increased, and therefore the high-frequency electromagnetic waves can reach the corners of the heating chamber 1 of a rectangular parallelepipedic shape. Thus, the effect of dispersion or distribution of the waves over the entire area of the heating chamber 1 by the wave stirrer fan 6 is enhanced, so that the degree of uniform heating of the object to be heated increases.

The arcuate corners of the generally-square feeder port 5 serve to adjust the degree of radiation of the high-frequency electromagnetic waves to the corners of the heating chamber 1. Another advantage of these arcuate corners is that when molding the feeder port cover 9, for example, of low-loss dielectric glass, molten glass can flow better if the corners of the feeder port cover 9 are arcuate, so that the feeder port cover 9 can be molded more easily.

Figure 4:
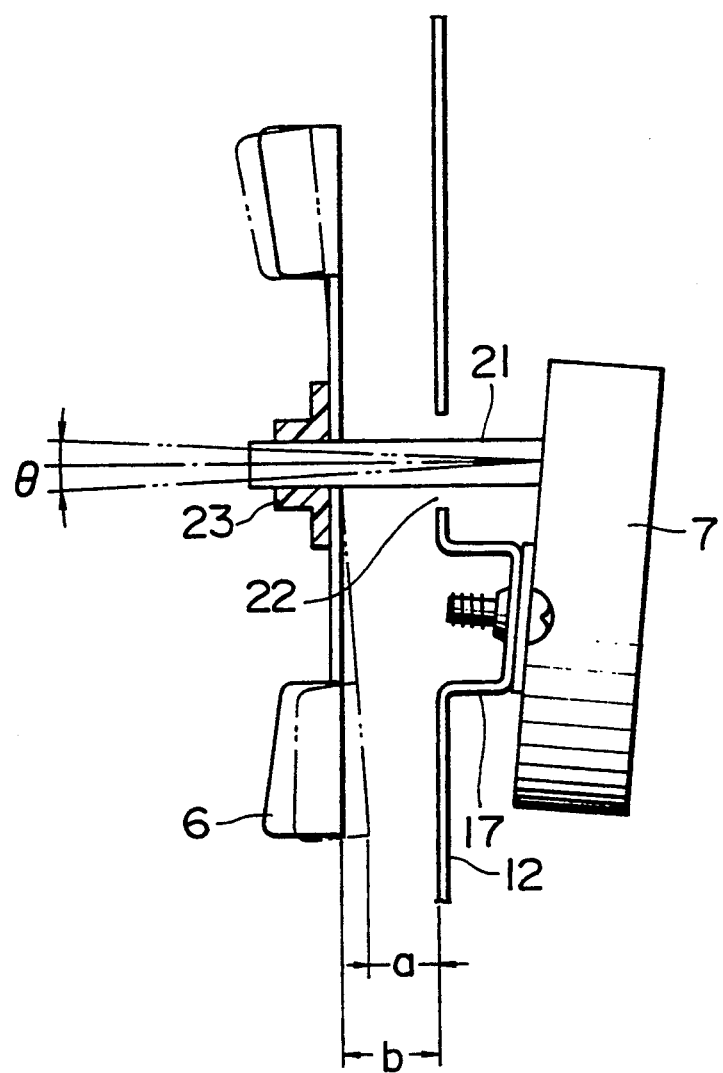
FIG. 4 a view showing a drive motor mounting portion in FIG. 2.

FIG. 4 is an enlarged view of a portion shown in FIG. 2. A rotation shaft 21 of the drive motor 7 is made of a heat-resistant resin such as tetrafluoroethylene in order to prevent leakage of the waves through a hole 22 through which the rotation shaft 21 extends. The wave stirrer fan 6 is fixedly secured to the distal end of the rotation shaft 21 through a boss 23. Generally, a clearance is provided between a rotation shaft of a motor and a bearing (not shown) for the motor; however, when the rotation shaft is made of a resin which has a high thermal expansion coefficient and is low in molding accuracy, such a clearance is large, so that the rotation shaft shakes considerably. If the rotation shaft 21 is of such a design is mounted horizontally, the distal end portion of the rotation shaft 21 is displaced downwardly at an angle $\theta$ because of the weight of the metallic wave stirrer fan 6 (which is relatively heavy) mounted on the distal end of the rotation shaft 21. As a result, the distance between the lower end of the wave stirrer fan 6 and the wall 12 of the wave stirrer fan chamber 10 becomes smaller as at a than the distance b obtained when the rotation shaft 21 is disposed in a horizontal condition, so that an electric discharge due to the high-frequency electromagnetic waves is liable to take place at the lower end of the wave stirrer fan 6. Therefore, in the present invention, the mounting portion 17 for the drive motor 7 is inclined to correct the angle $\theta$ of downward displacement of the rotation shaft 21 so as to keep the wave stirrer fan 6 parallel to the wall 12 of the wave stirrer fan chamber 10.

Figure 5:
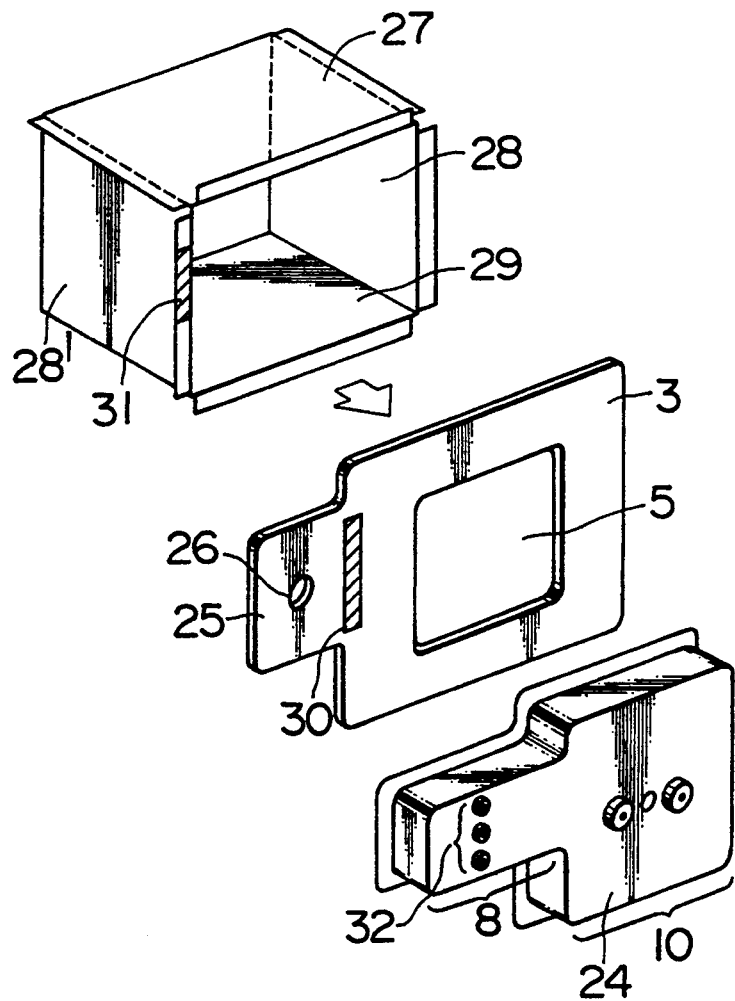
FIG. 5 is a view showing a wave guide and a rear wall of a heating chamber in FIG. 1.

FIG. 5 shows the construction of the wave guide and the associated parts. A structural member 24 of an integral construction is formed by drawing a metallic material, and constitutes the wave guide 8 and the wave stirrer fan chamber 10. This structural member 24 will be hereinafter referred to as "integral wave guide member". A portion 25 is extended from the rear wall 3 of the heating chamber 1, and defines a surface of the wave guide. A hole 26 for the insertion of an antenna of the high-frequency generator 4 therethrough is formed through this extension portion 25. The integral wave guide member 24 is fixedly secured to the rear wall 3 of the heating chamber 1 by spot welding or the like to constitute the wave guide 8 and the wave stirrer fan chamber 10. In the case where a fluororesin is coated to the inner surface of the heating chamber 1 to facilitate the cleaning thereof, such a coating material is sprayed from a direction of an arrow. More specifically, in the case where a coating material such as fluororesin is to be coated, in order to make it uniformly coated onto the surface of the rear wall 3 constituting a part of the inner surface of the heating chamber 1, the wave guide member 24 and the rear wall 3 are first secured together by spot welding or the like and then atomized coating material is sprayed in the direction of the arrow shown in FIG. 5. Thereafter, rear wall 3 with the integral wave guide member 24 fixed thereto is fixedly secured to a top wall 27, side walls 28 and 28' and a bottom wall 29 of the heating chamber 1 by suitable fastening means such as compressive clamping and spot welding. At this time, those portions 30 and 31 indicated by hatching are disposed inside the integral wave guide member 24, so that compressive clamping or spot welding can not be carried out, which may cause the leakage of the waves and other inconvenience. Therefore, in the present invention, holes 32, into which a compressive clamping punch or a welding electrode can be inserted, are formed through the integral wave guide member 24. The holes 32 are made as small as possible so that the waves will not leak therethrough, and besides these hole portions are projected outwardly, so that these hole portions do not need to be covered by a wave prevention metal member from the outside.

Figure 6:
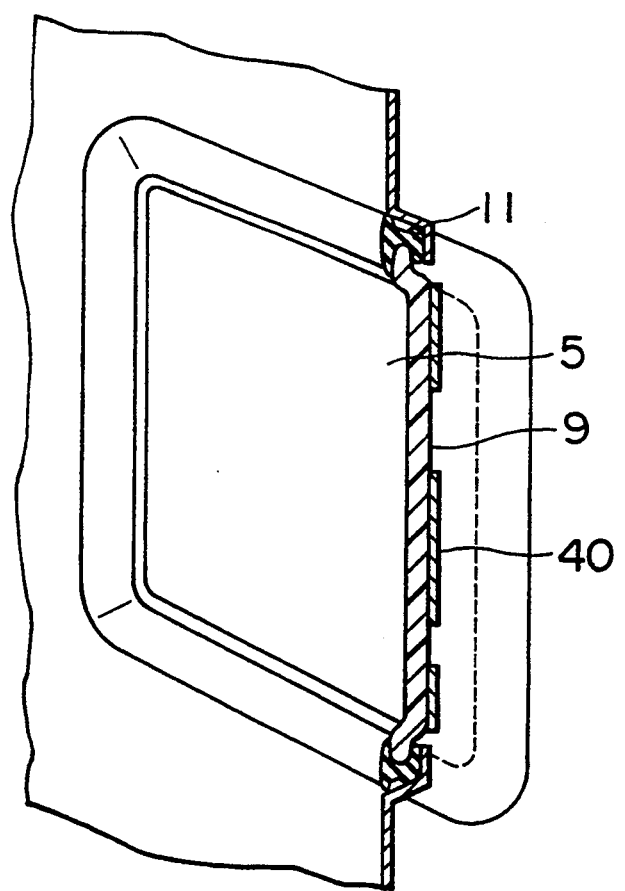
FIG. 6 is a view showing a feeder port cover for covering a feeder port.

FIG. 6 is a cross-sectional view showing an important portion of the feeder port 5. The feeder port cover 9 made of glass with a low dielectric loss is fixedly secured to the feeder port 5 of the heating chamber 1 through the resilient frame 11 fitted on the perimeter of the feeder port cover 9. The frame 11 is projected from the feeder port 5 toward the heating chamber 1. The feeder port cover 9 is concave or recessed away from the heating chamber 1, and a printing layer 40 is formed on one side or face of the feeder port cover 9 facing away from the heating chamber 1, the printing layer 40 being printed by ink with a low dielectric loss. The provision of the printing layer 40 enables the user or operator to confirm the rotation of the wave stirrer fan 6 during the operation of the heating device.

Figure 7:
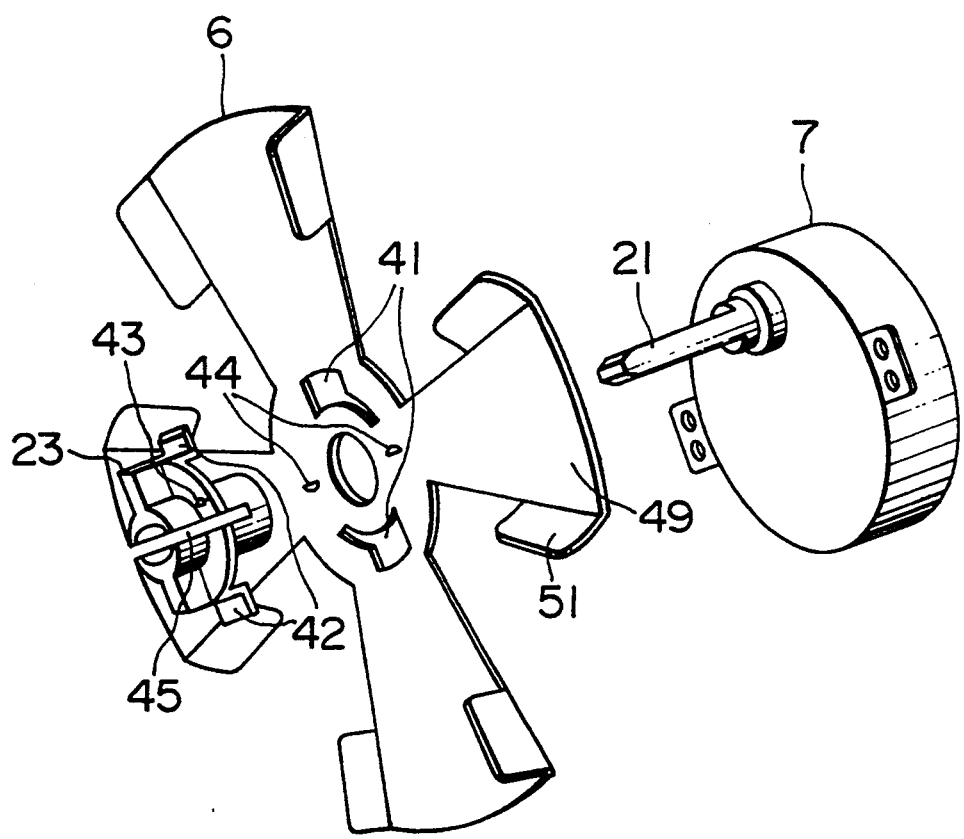
FIG. 7 is a perspective view of a wave stirrer fan.

FIG. 7 is a perspective view showing the wave stirrer fan 6. A plurality of (two in this embodiment) mounting holes 41 are formed through the wave stirrer fan 6, and a long side of each mounting hole 41 is generally not more than one fourth ($\frac{1}{4}$) of the wavelength of the high-frequency electromagnetic waves.

If the long side of the mounting hole 41 is greater than one fourth of the wavelength of the high-frequency electromagnetic waves, not only the distribution of the waves in the heating chamber 1 is adversely affected, but also there is encountered a possibility that a spark due to the high-frequency electromagnetic waves may occur at the mounting hole 41.

Two extensions or projections 42 formed on the boss 23 are inserted into the two mounting holes 41, respectively, and then the boss 23 is rotated or angularly moved through a predetermined angle relative to the wave stirrer fan 6, so that the boss 23 and the fan 6 are fixed to each other. When the boss 23 is attached to the wave stirrer fan 6, small holes 43 in the boss 23 fit respectively on projections 44 on the fan 6, and are prevented from disengagement therefrom. The boss 23, which is made of a low-loss dielectric material and has a slit 45 extending generally parallel to the rotation shaft 21 of the drive motor 7, is press-fitted on the rotation shaft 21 which is made of a low-loss dielectric material and has a generally oval cross-section, thereby fixing the boss 23 to the rotation shaft 21.

A pair of second stirrer blades 51 are formed respectively on opposite side edges of each stirrer blade 49 at the distal end portion of the blade 49. The second stirrer blades 51 serve to enhance the efficiency of radiation of the high-frequency electromagnetic waves through the spaces between the stirrer blades 49, and also serve to prevent a spark due to the high-frequency electromagnetic waves at the distal end of the stirrer blade 49.

Figure 8:
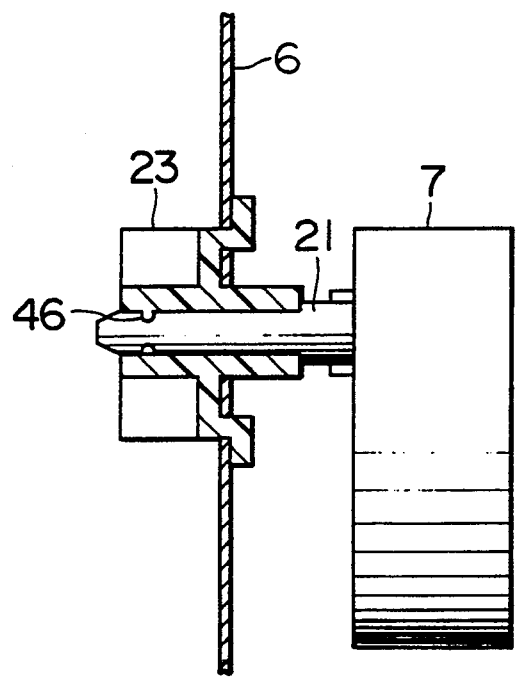
FIG. 8 is a cross-sectional view of the wave stirrer fan in its assembled condition.
Figure 9:
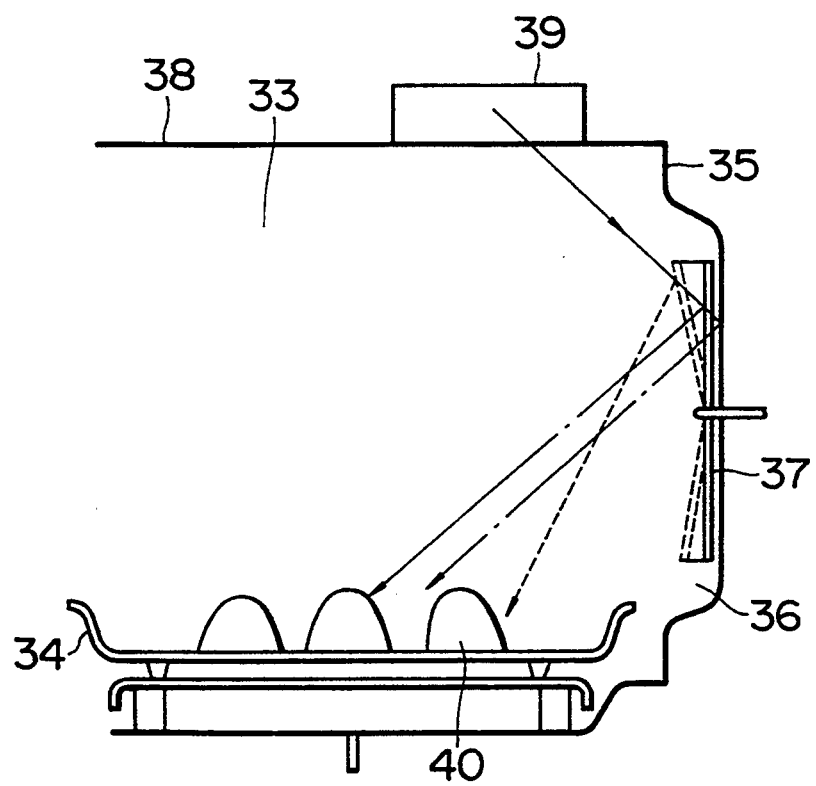
FIG. 9 is a schematic cross-sectional view of the conventional heating device.

FIG. 8 is a cross-sectional view showing the wave stirrer fan 6 in its assembled condition. When the boss 23 is attached to the rotation shaft 21, a projection 46 on the boss 23 fits in a corresponding depression in the rotation shaft 21, thereby preventing the boss 23 from being disengaged from the rotation shaft 21.

As described above, in the present invention, the rotary table 2 is provided in the heating chamber 1, and the wave stirrer fan 6 is provided on the side of the heating chamber 1, and the feeder port 5 is provided in front of the wave stirrer fan 6, and the high-frequency electromagnetic waves fed from the side of the feeder port 5 are radiated in all directions (that is, upward, downward, right and left) into the heating chamber 1, so that the degree of uniformity of the heating of the object is greatly enhanced during the rotation of the rotary table 2. More specifically, in the first cited reference (Japanese Patent Publication No. 60-25875), since the feeder port is disposed at the upper portion of the heating chamber, a vertical distribution of the waves is uneven, so that the upper portion of the object to be heated tends to be strongly heated. In the second cited reference (U.S. Pat. No. 2,748,239), since the feeder port is disposed at the rear portion of the heating chamber, a planar distribution is uneven, so that the rear portion of the heating chamber tends to be strongly heated. Further, in the third cited reference (U.S. Pat. No. 4,136,271), the antenna for radiating waves is disposed at the upper portion, so that the upper portion of the object to be heated is heated strongly.

In contrast with these conventional devices, in the present invention, the degree of uniformity of the heating is good with respect to both horizontal and vertical distributions, and therefore frozen food can be thawed without fail, and for example, when heating milk held in a cup, an upper portion thereof will not be heated excessively.

The high-frequency electromagnetic waves are radiated directly to the object to be heated from the side of the heating chamber 1, and therefore even if the dimension of the heating chamber 1 is slightly changed, the uniform distribution performance will hardly be affected.

In the above embodiment, although the feeder port 5 has been explained to have a generally square shape, this is not limitative, though such a square shape is advantageous from the viewpoint of manufacture, and the feeder port may have any other shape than a circular shape.

The lower edge of the feeder port 5 is disposed at a level above the rotary table 2, and with this arrangement even if the rotary table 2 is inadvertently put too deep in the heating chamber 1, the rotary table 2 strikes against the frame 11, thus preventing the feeder port cover 9 from being damaged or broken.

The axis of rotation of the rotary table 2 generally perpendicularly intersects the axis of rotation of the wave stirrer fan 6, and therefore the high-frequency electromagnetic waves are radiated generally symmetrically right and left with respect to the axis of rotation of the rotary table 2, so that the difference in heating intensity between the central portion and the peripheral portion of the rotary table 2 is small during the rotation of the rotary table 2.

The number of revolution of the rotary table 2 is different from that of the wave stirrer fan 6, and therefore even if the load is placed on any portion of the rotary table 2, the uniformity of the heating in the vertical and horizontal directions is the same since the direction of radiation of the high-frequency electromagnetic waves from the wave stirrer fan 6 is different. That is, when the number of revolution of the rotary table 2 is identical with the number of revolution of the stirrer fan 6, the positional relationship or relative position between the table 2 and the fan 6 is kept unchanged while they are being rotated. Thus, the distribution of electromagnetic waves is not changed. On the other hand, in the case of the illustrated embodiment in which the number of revolution of the rotary table 2 and the number of revolution of the stirrer fan 6 are different from each other, the positional relationship in question varies with the lapse of time. Consequently, the distribution of electromagnetic waves would vary in succession and as a result uniform heating may be performed.

The inclination of the wave stirrer fan 6 which is caused by the shaking of the rotation shaft of the drive motor is corrected as described above, and therefore an electric discharge which may occur at the radial end of the wave stirrer fan 6 is suppressed, and the lowered stirring performance due to the inclination of the wave stirrer fan is prevented.

The wave stirrer fan chamber 10 and the wave guide 8 are provided on the side of the heating chamber 1, and with this construction even in the high-frequency heating device equipped with the heaters, the arrangement of the heaters is not limited, so that a uniform wave heating can be achieved. Moreover, with the improved means for mounting the feeder port cover 9, the frame 11 and the drive motor 7, the increase of the cost for a heat-resistant design against the heat produced by the heaters can be prevented.

The wave guide 8 and the wave stirrer fan chamber 10 are constituted by the integral structural member 24 formed by drawing or the like, and the mounting portion 25 for the high-frequency generator 4 is formed merely by extending part of the rear wall 3 of the heating chamber 1. Thus, the construction is simple, and besides the integral wave guide member 24 is provided with the holes 32 for receiving a punch for compressive clamping or an electrode for spot welding. Therefore, the assembling of the heating chamber 1 is easy, and the heating device can be fabricated at lower costs as a whole.

The size of the feeder port 5 is generally equal to or larger than the size of the wave stirrer fan 6, and with this arrangement the wave stirrer fan 6 can be attached to the drive motor 7 from the front side of the heating chamber 1, and therefore the integral wave guide member 24 can be of a simple configuration. If this attachment from the front side of the heating chamber is impossible, the drive motor and the wave stirrer fan are first fixedly secured to the integral wave guide member, and then the integral wave guide member is secured by screws to the rear wall of the heating chamber. Alternatively, the drive motor-mounting portion of the integral wave guide member is of a lid-like construction such that this portion can be removed together with the wave stirrer fan. Therefore, in the case of effecting the fixture by the screws, the screws must be driven at a pitch of 20 to 30 mm, and a number of screws are needed in either method. This detracts from the appearance, and adversely affects the assembling efficiency.

Generally, in the case of a heating device equipped with a heater, a heat-resistant coating such as a fluororesin coating is often applied to an inner surface of a heating chamber to facilitate the cleaning thereof. In the present invention, the feeder port 5 is larger in size than the wave stirrer fan 6 and with this arrangement, if the coating is applied after the integral wave guide member 24 is spot-welded to the rear wall 3 of the heating chamber 1, the coating material is introduced through the feeder port 5 even in the case of a spray coating, so that the coating material is coated to that wall of the wave stirrer fan chamber 10, facing the wave stirrer fan 6, to form an insulating film which suppresses a spark at the wave stirrer fan 6.

Since the feeder port 5 of the heating chamber 1 is protected by the feeder port cover 9 of strong glass, the wave stirrer fan 6 is prevented from being deformed. The resilient frame 11 fits on the perimeter of the feeder port cover 9, and is projected from the feeder port cover 9, and the feeder port cover 9 is recessed, and is fixed to the feeder port 5. Therefore, even if the rotary table 2 is inadvertently caused to strike against the feeder port portion, the frame 11 protects the feeder port cover 9, and absorbs an impact. Furthermore, the printing is formed by ink of a low dielectric loss on the surface of the feeder port cover 9, and therefore when the wave stirrer fan 6 stops because of a malfunction, the user can soon notice it.

The feeder port cover 9 may be made of any other suitable material than glass, such as pottery and porcelain, in which case a similar effect can, of course, be obtained.

The feeder port cover 9 is mounted relative to the feeder port 5 through the resilient frame 11 fitted on the perimeter of the feeder port cover 9, and therefore the feeder port cover 9 can be stably mounted in place, absorbing a dimensional variation in the glass panel constituting the cover 9.

Since the feeder port cover 9 is fixedly mounted to the feeder port 5 of the heating chamber 1 through the frame 11, the frame 11 forms a seal to prevent the intrusion of food draff and vapor, and therefore the deterioration of the insulation of the drive motor and other parts due to the heat and the vapor is prevented, and also the generation of rust can be prevented.

The wave stirrer fan 6 has a plurality of mounting holes 41 each having the dimension generally not more than one fourth (¼) of the wavelength of the high-frequency electromagnetic waves, and the extensions 42 formed on the boss 23 are inserted respectively into the two mounting holes 41 to fix the wave stirrer fan 6. This arrangement will not adversely affect the stirring effect, and a spark due to the high-frequency electromagnetic waves will never occur at the mounting holes 41. The wave stirrer fan 6 and the boss 23 can be easily connected together, and the number of the component parts is small, and therefore the cost is low, and the assembling is easy.

For fixing the boss 23 to the output shaft 21 of the drive motor 7, the slit 45 is formed in the boss 23, and the boss 23 is attached to the rotation shaft 21, utilizing the resiliency of the boss 23. Therefore, the boss 23 can be easily attached to the rotation shaft 21 from the side facing the rotation shaft 21.

Since the projection 46 on the boss 23 fits in the corresponding depression in the rotation shaft 21, a stress does not acts on the boss 23. Therefore, even when the temperature within the heating chamber 1 is raised by the heaters, the boss 23 will not be deformed, and the boss 23 will not become disengaged from the rotation shaft 21.

As described above, in the present invention, the rotary table is provided at the bottom of the heating chamber, and the feeder port is provided at the side of the heating chamber, and the high-frequency electromagnetic waves are fed from the side of the feeder port, and the wave stirrer fan is provided in the vicinity of the feeder port. With this construction, a uniform heating condition can be obtained with respect to various kinds of food. For example, when warming milk, the difference in temperature between an upper portion and a lower portion is small, and when heating food having a generally flat configuration, the difference in heating between a central portion and an outer peripheral portion is small. When thawing frozen food, the thawing can be done uniformly, and particularly the apex portion and the side portion of the frozen food will not be unduly heated to be boiled, but the frozen food can be thawed uniformly.

The arrangement of the heaters is not limited, and therefore the heating performance of the heater is not affected.

The heating device of the present invention is reliable against a spark due to the high-frequency electromagnetic waves and a misuse by the user, and is simple in construction and therefore can be easily assembled, and is less costly.

What is claimed is:

1. A heating cooking device comprising:
    a housing having walls which form a heating chamber for heating an object to be heated therein;
    a high-frequency oscillator for generating high-frequency electromagnetic waves;
    a wave guide for guiding the high-frequency electromagnetic waves from said high-frequency oscillator to a single feeder port, disposed in one of the walls forming said heating chamber, and into said heating chamber through the feeder port;
    a rotary table, disposed in said heating chamber, for rotatably supporting on a first surface thereof the object to be heated; and
    a single wave stirrer fan for stirring the electromagnetic waves going into said heating chamber, said wave stirrer fan being disposed within said wave guide facing said feeder port;
    wherein said wave guide and feeder port extend perpendicularly to the first surface of said rotary table along the wall having said feeder port, said high-frequency oscillator is disposed to a side of said feeder port along the wall having said feeder port, and said feeder port has a shape other than circular.

2. A heating cooking device according to claim 1, wherein a lower edge of said feeder port is disposed at a level above said rotary table.

3. A heating cooking device according to claim 1, wherein an axis of rotation of said rotary table generally perpendicularly intersects an axis of rotation of said wave stirrer fan.

4. A heating cooking device according to claim 1, wherein a speed of rotation of said wave stirrer fan is different from a speed of rotation of said rotary table.

5. A heating cooking device according to claim 1, further comprising a feeder port cover made of a low-loss dielectric material for covering said feeder port.

6. A heating cooking device according to claim 5, wherein said feeder port cover is made of glass having a low dielectric loss.

7. A heating cooking device according to claim 6, further comprising a printed layer formed on a surface of said feeder port cover by ink having a low dielectric loss.

8. A heating cooking device according to claim 5, further comprising a resilient frame having a low dielectric loss disposed on an outer peripheral portion of said feeder port cover, said frame projecting from said feeder port cover toward said heating chamber.

9. A heating cooking device according to claim 1, further comprising a drive motor having a rotation shaft, said wave stirrer fan being mounted on an end of said rotation shaft, for rotating said wave stirrer fan, wherein said rotation shaft is born by a bearing for the motor with a clearance defined therebetween such that said rotation shaft may be subject to downward displacement from horizontal, and said drive motor is mounted on a mounting portion of said housing with an angle of inclination to compensate for a downward displacement from horizontal of said rotation shaft, thereby keeping said wave stirrer fan substantially parallel with said wall having said feeder port.

10. A heating cooking device according to claim 9, further comprising a wave stirrer fan chamber in said waveguide for accommodating said wave stirrer fan, said mounting portion on which said drive motor is mounted being formed by a projection on a portion of a wall of said wave stirrer fan chamber so that a space is formed between said drive motor and said wave stirrer fan chamber.

11. A heating cooking device according to claim 9, wherein said wave guide is formed integrally with said wave stirrer fan chamber, and said feeder port connects an interior of said wave stirrer fan chamber with an interior of said heating chamber.

12. A heating cooking device according to claim 9, wherein said feeder port is formed in a wall which forms a rear wall of said heating chamber, and said feeder port is large enough to permit said wave stirrer fan to pass therethrough during assembly of the device.

13. A heating cooking device according to claim 9, further comprising a coating applied to a portion of said wave stirrer fan chamber which is adjacent to said wave stirrer fan and opposite said feeder port.

14. A heating cooking device according to claim 9, wherein said wave stirrer fan has a boss made of a low-loss dielectric material attached thereto, said boss having a plurality of extensions, and wherein said wave stirrer fan has a plurality of mounting holes each having a dimension not more than generally one fourth of the wavelength of the high-frequency electromagnetic waves, a respective one of said extensions of said boss being for fixed insertion in a respective one of said mounting holes.

15. A heating cooking device according to claim 14, wherein said wave stirrer fan has a projection formed thereon, and said boss has a small hole is formed therein, said wave stirrer fan projection for insertion in said small hole in said boss to prevent said boss from disengaging from said wave stirrer fan.

16. A heating cooking device according to claim 14, wherein said rotation shaft of said drive motor is made of a low-loss dielectric material, has a depression formed therein, and has a non-circular transverse cross-section, and wherein said boss has resiliency and has a slit extending generally parallel to said rotation shaft of said drive motor, said boss having a through hole similar in cross-section to said rotation shaft of said drive motor, and said boss having a projection formed thereon, said projection formed on said boss being for insertion in said depression formed in said rotation shaft of said drive motor.

17. A heating cooking device according to claim 9, wherein said wave stirrer fan has a plurality of first stirrer blades of a generally sector-shape.

18. A heating cooking device according to claim 17, wherein a second stirrer blade is formed at a distal end portion of each of said first stirrer blades.

* * * * *